June 19, 1973     D. G. SWINDELLS     3,740,298
METHOD AND MACHINE FOR THE MANUFACTURE OF WALLPAPER
Filed March 2, 1970
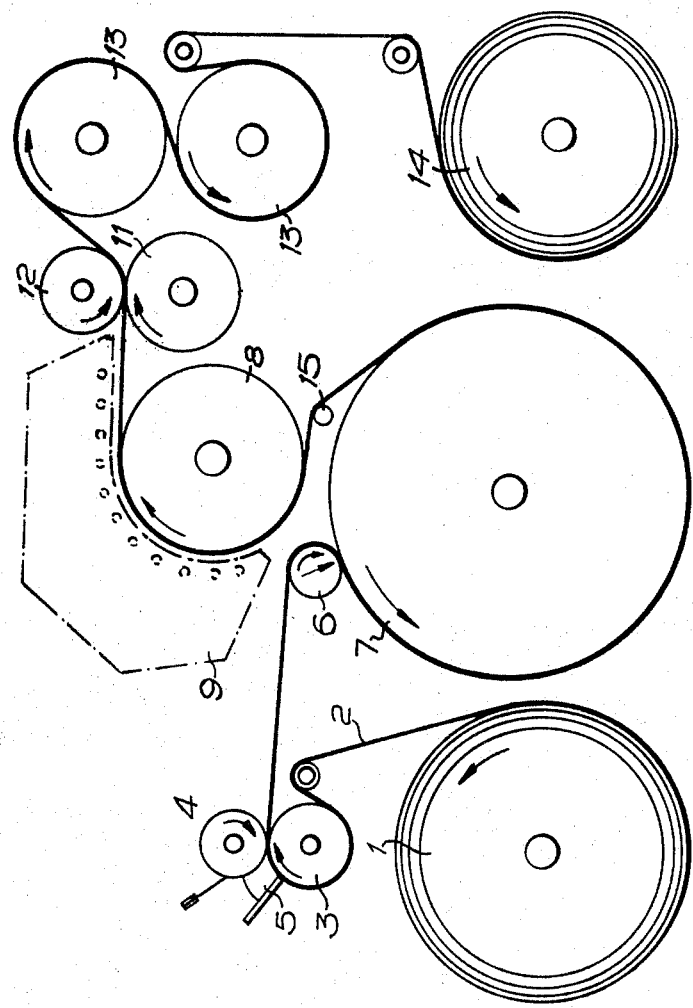
INVENTOR
DEREK GORDON SWINDELLS
BY
Norris & Bateman

United States Patent Office 3,740,298
Patented June 19, 1973

3,740,298
METHOD AND MACHINE FOR THE
MANUFACTURE OF WALLPAPER
Derek G. Swindells, Billington, England, assignor to
Emmerson & Renwick Limited, Accrington County of
Lancaster, England
Filed Mar. 2, 1970, Ser. No. 15,580
Int. Cl. B32b *31/08, 31/20*
U.S. Cl. 156—553                              4 Claims

ABSTRACT OF THE DISCLOSURE

A machine for the production of vinyl wallpaper in which a plastic paste such as P.V.C. is applied to one face of the web or substrate from a reservoir by a pair of coating rollers, one of the rollers being cleaned by a doctor blade, and passing the web over a heated drying drum from which it is stripped and passed over a warming roller before passing through embossing rollers and finally through cooling rollers.

---

This invention relates to improvements in machines for the production of wallpaper and more particularly in the manufacture of vinyl wallpaper in which a plastics material such as poly-vinyl-chloride (P.V.C.) paste is applied to one face of a paper web or substrate.

The invention comprises a reservoir for a paste of a plastics material, a pair of coating rollers through which a web of paper passes to which the paste of the plastics material is applied immediately before the nip of the rollers, a doctor blade to clean the rollers in contact with the paste, a heated gelling drum or roller over which the coated web or substrate passes to gel or cure the coating, a variable pressure neoprene covered roller over which the web passes to the drum, a stripping roller for removing the web from the drum, a warming roller over which the coated web or substrate passes from the stripping roller to soften the cured surface thereof and a pair of embossing rollers to apply a pattern to the web or substrate.

If no patterning is desired the embossing rollers may be replaced by smoothing rollers.

The invention will be described with reference to the accompanying drawing showing a diagrammatic elevation of the machine.

The machine comprises mountings for a reel 1 from which a paper web or substrate 2 is drawn around the underside of the lower roller 3 of a pair of coating rollers and through the nip of the rollers 3, 4. A reservoir 5 for a P.V.C. paste or otherwise paste of a plastics material supplies a film of paste transversely to one surface of the web or substrate 2 immediately before the web or substrate passes through the nip of the rollers the pressure between the rollers at the nip spreading the paste of the plastics material in an even film of a predetermined thickness over the surface of the web or substrate 2. The coating rollers 3, 4 may be adjustable to vary the thickness of the coating applied to the web or substrate. The top roller 4 revolves slowly in the opposite direction to the direceion of the web or substrate 2 thus presenting a continuous, clean wiping action at the nip and preferably rotates at between 5 to 25 feet per minute. The coated web or substrate then passes over a neoprene covered guide roller 6 forming a variable pressure nip of between 50 to 150 pounds against a drum or roller 7 heated to a temperature of between 300° to 350° F. with the coated face in contact therewith to gel or cure the paste, and the web or substrate is then removed from the heated drum over a roller 15 which assists in stripping the web or substrate from the drum.

The coated web or substrate 2 passes from the roller 15 over a "warming" roller 8 and if desired, with the coated surface outermost below an infra-red heater 9 which applies radiant energy to the coated face to soften the cured surface of the web. The infra-red heater 9 may extend beyond the line at which the web or substrate 2 leaves the warming roller 8. Alternatively the web may pass between a pair of smoothing rollers where no patterning is desired.

After the coating has been softened the web or substrate 2 passes between a pair of embossing rollers 11, 12 to apply a pattern thereto and then over a cooling roller or rollers 13 before being finally rewound onto a reel 14 or take up roller.

What I claim is:
1. A machine for the production of a wallpaper web comprising first roller means maintained at ambient temperature for coating the surface of a moving paper or like web with a uniform predetermined thickness layer of plastics material in uncured paste form, means for curing said coated layer on said web including a curing roller having a heated surface, a resilient surfaced pressure roller biased against said said curing roller and adjustable to provide a variable pressure nip between said rollers, said coated web passing through said nip and being applied under pressure with said layer in direct contact with the roller surface, the temperature of said roller surface and the extent of contact of the web therewith being sufficient to cure said coated layer upon said web.

2. The machine defined in claim 1, wherein said plastics material is a polyvinylchloride in paste form, and curing roller surface is heated to about 300–350° F.

3. The machine defined in claim 1, comprising heating means and means for stripping the web containing the cured coating thereon from said heated roller and for passing is through said heating means wherein the cured coating is softened for further processing.

4. The machine defined in claim 3, comprising embossing means receiving said web from said heating means for embossing the softened coated surface, and means for cooling the embossed web.

References Cited

UNITED STATES PATENTS

| | | | |
|---|---|---|---|
| 3,423,273 | 1/1969 | Mazur | 156—501 X |
| 2,607,712 | 8/1952 | Sturken | 156—501 |
| 3,400,036 | 9/1968 | Hemrick et al. | 156—242 X |
| 2,905,969 | 9/1959 | Gilbert et al. | 18—10 |
| 2,771,388 | 11/1956 | Rocky et al. | 156—242 |

BENJAMIN A. BORCHELT, Primary Examiner

J. M. HANLEY, Assistant Examiner

U.S. Cl. X.R.

156—242, 501